(12) United States Patent
Kumazaki et al.

(10) Patent No.: US 10,012,309 B2
(45) Date of Patent: Jul. 3, 2018

(54) CONTROL APPARATUS FOR VEHICLE

(71) Applicant: TOYOTA JIDOSHA KABUSHIKI KAISHA, Toyota-shi, Aichi-ken (JP)

(72) Inventors: Kenta Kumazaki, Anjo (JP); Kazuyuki Shiiba, Miyoshi (JP); Tooru Matsubara, Toyota (JP); Hideharu Nohara, Toyota (JP); Masayuki Baba, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 15/246,885

(22) Filed: Aug. 25, 2016

(65) Prior Publication Data

US 2017/0067557 A1 Mar. 9, 2017

(30) Foreign Application Priority Data

Sep. 3, 2015 (JP) .................................. 2015-173987

(51) Int. Cl.
*F16H 61/16* (2006.01)
*F16H 61/02* (2006.01)
(Continued)

(52) U.S. Cl.
CPC ........... *F16H 61/0213* (2013.01); *B60K 6/20* (2013.01); *B60K 6/36* (2013.01); *B60W 20/30* (2013.01); *F16H 3/728* (2013.01); *F16H 61/16* (2013.01); B60W 30/18172 (2013.01); B60Y 2200/92 (2013.01); B60Y 2300/18175 (2013.01); B60Y 2300/70 (2013.01); B60Y 2400/73 (2013.01); F16H 2059/506 (2013.01); F16H 2061/0234 (2013.01); F16H 2061/0239 (2013.01); F16H 2061/163 (2013.01); F16H 2061/166 (2013.01); F16H 2200/0043 (2013.01); F16H 2200/201 (2013.01); F16H 2200/2043 (2013.01);
(Continued)

(58) Field of Classification Search
CPC ............ B60W 30/18172; B60W 20/30; B60Y 2300/18175; F16H 61/16; F16H 2059/506; F16H 2061/166; F16H 2061/163; F16H 2061/0234; F16H 2061/0239
USPC .................................................... 701/60, 62
See application file for complete search history.

(56) References Cited

U.S. PATENT DOCUMENTS 6,188,946 B1 * 2/2001 Suzuki .............. F16H 61/66254
477/46
2014/0297142 A1 10/2014 Kojima et al.
2015/0204441 A1 * 7/2015 Kinoshita ......... F16H 61/66259
701/62

FOREIGN PATENT DOCUMENTS

EP 0898098 A2 * 2/1999 ........... B60K 28/165
EP 1580465 A2 * 9/2005 ............. F16H 61/16
(Continued)

*Primary Examiner* — Roger L Pang
(74) *Attorney, Agent, or Firm* — Oliff PLC

(57) ABSTRACT

An electronic control unit is configured to, when the electronic control unit determines that any one of a first condition and a second condition is satisfied, preferentially execute lower limit speed ratio control. The first condition is a condition that, after the electronic control unit starts shift prohibition control, a wheel lock has occurred before a condition for cancelling the shift prohibition control is satisfied. The second condition is a condition that, after the electronic control unit starts the lower limit speed ratio control, a wheel spin has occurred before a condition for cancelling the lower limit speed ratio control is satisfied.

3 Claims, 10 Drawing Sheets

(51) Int. Cl.
  *B60K 6/20* (2007.10)
  *B60K 6/36* (2007.10)
  *B60W 20/30* (2016.01)
  *F16H 3/72* (2006.01)
  *B60W 30/18* (2012.01)
  *F16H 59/50* (2006.01)

(52) U.S. Cl.
  CPC ........... *F16H 2200/2066* (2013.01); *F16H 2200/2082* (2013.01); *Y10S 903/91* (2013.01); *Y10S 903/945* (2013.01); *Y10T 477/647* (2015.01)

(56) References Cited

FOREIGN PATENT DOCUMENTS

| | | |
|---|---|---|
| JP | H03-193533 A | 8/1991 |
| JP | H09-240447 A | 9/1997 |
| JP | 2001-208182 A | 8/2001 |
| JP | 2001-330123 A | 11/2001 |
| JP | 2005-076846 A | 3/2005 |
| JP | 2014-199088 A | 10/2014 |

* cited by examiner

|      | C1 | C2 | C3 | B1 | B2  | F1 |
|------|----|----|----|----|-----|----|
| 1st  | O  |    |    |    | (O) | O  |
| 2nd  | O  |    |    | O  |     |    |
| 3rd  | O  | O  |    |    |     |    |
| 4th  |    | O  |    | O  |     |    |
| Rev  |    |    | O  |    | O   |    |
| N    |    |    |    |    |     |    |

O : ENGAGED   (O) : ENGAGED DURING ENGINE BRAKE

CONTROL APPARATUS FOR VEHICLE

INCORPORATION BY REFERENCE

The disclosure of Japanese Patent Application No. 2015-173987 filed on Sep. 3, 2015 including the specification, drawings and abstract is incorporated herein by reference in its entirety.

BACKGROUND

1. Technical Field

The present disclosure relates to a control apparatus for a vehicle including a driving force source and a transmission.

2. Description of Related Art

Among vehicles including an engine (driving force source) and an automatic transmission, there is known a vehicle that executes control for prohibiting a shift of the automatic transmission, as control for a wheel spin, when the drive mode of the vehicle is changed to a drive mode that is used in a situation in which a wheel spin easily occurs (see, for example, Japanese Patent Application Publication No. 2005-076846 (JP 2005-076846 A)).

SUMMARY

In a vehicle including an automatic transmission, control for prohibiting a shift is executed (shift prohibition control) such that the shift is not performed at unintended timing at the time of wheel spin determination. As a technique for a wheel lock, there is control for limiting a lower limit speed ratio depending on a vehicle body speed (lower limit speed ratio control) in order for an input shaft rotation speed of a transmission not to rapidly increase when tire grip recovers under wheel lock.

In a vehicle that is able to execute such shift prohibition control and lower limit speed ratio control, for example, when both the following situations (1) and (2) occur, because a gear position is held in 1st (continuously placed in 1st) due to shift prohibition, if tire grip recovers as a result of brake release, each wheel speed (an output shaft rotation speed of the transmission) rapidly increases, with the result that an overspeed of an input shaft of the transmission may occur.

(1) A state where a shift is prohibited through shift prohibition control (a state where the gear position is fixed to 1st) at the time of a wheel spin when the gear position of the transmission is the lowest (1st).

(2) A state where, after a wheel lock has occurred as a result of brake depression, the brake is released during continuation of shift prohibition.

The present disclosure is contemplated in consideration of such a situation, and implements control that is able to prevent an overspeed of an input shaft of a transmission at the time when tire grip recovers after a wheel lock has occurred in a control apparatus for a vehicle that is able to execute shift prohibition control and lower limit speed ratio control.

An aspect of the present disclosure provides a control apparatus for a vehicle including a driving force source and a transmission. The control apparatus includes: an electronic control unit configured to i) execute shift prohibition control, the shift prohibition control being control for prohibiting a shift of the transmission when the electronic control unit determines that a wheel spin has occurred, ii) execute lower limit speed ratio control, the lower limit speed ratio control being control for limiting a lower limit speed ratio of the transmission in response to a vehicle body speed the electronic control unit determines that a wheel lock has occurred, and iii) when the electronic control unit determines that any one of a first condition and a second condition is satisfied, not execute the shift prohibition control but execute the lower limit speed ratio control, the first condition being a condition that, after the electronic control unit starts the shift prohibition control, a wheel lock has occurred before a condition for cancelling the shift prohibition control is satisfied, the second condition being a condition that, after the electronic control unit starts the lower limit speed ratio control, a wheel spin has occurred before a condition for cancelling the lower limit speed ratio control is satisfied.

According to the aspect of the present disclosure, after the electronic control unit determines that a wheel spin has occurred and starts the shift prohibition control, and when the electronic control unit determines that a wheel lock has occurred before the condition for cancelling the shift prohibition control is satisfied, the electronic control unit preferentially executes the lower limit speed ratio control. That is, when a request to execute the shift prohibition control (when affirmative wheel spin determination is made) and a request to execute the lower limit speed ratio control (when affirmative wheel lock determination is made) overlap with each other, the electronic control unit preferentially executes the lower limit speed ratio control.

Through such control, when a wheel lock has occurred under shift prohibition resulting from the shift prohibition control, it is possible to limit the speed ratio of the transmission to a lower limit speed ratio commensurate with the vehicle body speed under the wheel lock. Specifically, when the speed ratio of the transmission under wheel spin is the lowest (1st) and the vehicle body speed under wheel lock is such a vehicle body speed that there is a concern about an overspeed at the lowest speed ratio, it is possible to limit the speed ratio to a speed ratio (2nd) higher than the lowest speed ratio through the lower limit speed ratio control. After a wheel lock, when tire grip recovers as a result of brake release, because the speed ratio of the transmission is the speed ratio (2nd) higher than the lowest speed ratio (1st), it is possible to prevent an overspeed of an input shaft of the transmission even when the wheel speed (an output shaft rotation speed of the transmission) steeply increases.

According to the aspect of the present disclosure, after the electronic control unit determines that a wheel lock has occurred and starts the lower limit speed ratio control, and when the electronic control unit determines that a wheel spin has occurred before the condition for cancelling the lower limit speed ratio control is satisfied, the electronic control unit preferentially executes the lower limit speed ratio control. That is, when a request to execute the lower limit speed ratio control (when affirmative wheel lock determination is made) and a request to execute the shift prohibition control (when affirmative wheel spin determination is made) overlap with each other, the electronic control unit preferentially executes the lower limit speed ratio control.

Through such control, even when the electronic control unit determines that a wheel spin has occurred after a wheel lock has occurred, the electronic control unit is able to preferentially execute the lower limit speed ratio control. It is possible to limit the speed ratio of the transmission to the lower limit speed ratio commensurate with the vehicle body speed under wheel lock (for example, limit the speed ratio to 2nd). Thus, after a wheel lock, even when tire grip recovers as a result of brake release and each wheel speed (the output shaft rotation speed of the transmission) steeply increases, it is possible to prevent an overspeed of the input shaft of the transmission.

In the aspect of the present disclosure, the condition for cancelling the shift prohibition control may be satisfied when a first predetermined time has elapsed from a point in time at which a wheel spin amount falls within a first predetermined range, and the condition for cancelling the lower limit speed ratio control may be satisfied when a second predetermined time has elapsed from a point in time at which a wheel lock amount falls within a second predetermined range. Through such condition settings, it is possible to appropriately determine that the shift prohibition control and the lower limit speed ratio control are reliably cancelled.

According to the aspect of the present disclosure, in the control apparatus for a vehicle, which is able to execute the shift prohibition control and the lower limit speed ratio control, it is possible to prevent an overspeed of the input shaft of the transmission at the time when tire grip recovers after a wheel lock has occurred.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
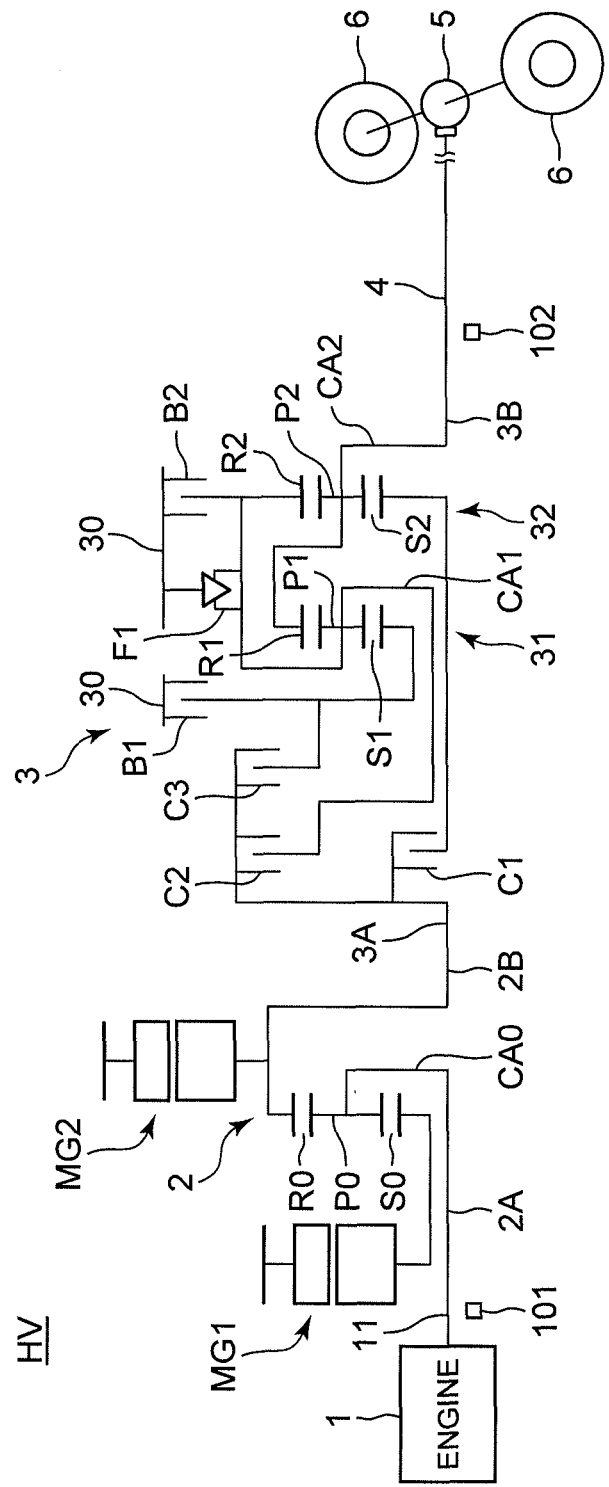
FIG. 1 is a skeletal view that shows the schematic configuration of an example of a vehicle to which the control apparatus according to the present disclosure is applied.

Hereinafter, an embodiment of the present disclosure will be described with reference to the accompanying drawings.

Initially, an example of a vehicle to which the present disclosure is applied will be described with reference to FIG. 1.

The vehicle in this example is a front-engine rear-drive (FR) hybrid vehicle HV. The vehicle includes an engine 1 that generates driving force for propelling the vehicle, a first motor generator MG1 that mainly functions as a generator, a second motor generator MG2 that mainly functions as an electric motor, a power split mechanism 2, a transmission 3, a propeller shaft 4, a differential unit 5, drive wheels (rear wheels) 6, driven wheels (front wheels (not shown)), and the like. An HV_ECU (electronic control unit) 100, an engine ECU 200, an MG_ECU 300, a brake ECU 400, and the like, are provided as control systems. These HV_ECU 100, engine ECU 200, MG_ECU 300 and brake ECU 400 are connected to one another so as to be communicable with one another (see FIG. 2). These control systems may be integrated as at least one ECU.

The motor generators MG1, MG2, the power split mechanism 2 and the transmission 3 are configured symmetrically with respect to the axis, so the lower half is omitted in the skeletal view of FIG. 1.

Next, the engine 1, the motor generators MG1, MG2, the power split mechanism 2, the transmission 3, a propeller shaft 4, the ECUs 100, 200, 300, 400, and the like, will be described below.

The engine 1 is a known power unit, such as a gasoline engine and a diesel engine, that outputs power by burning fuel. For example, an operating state, such as a throttle opening degree (intake air amount) of a throttle valve (not shown) provided in an intake passage, a fuel injection amount and ignition timing, is configured to be controllable. The operating state of the engine 1 is controlled by the engine ECU 200. The engine ECU 200 executes various control over the engine 1, including intake air amount control, fuel injection amount control and ignition timing control, in response to an output power request from the HV_ECU 100. The output power of the engine 1 is transmitted to an input shaft 2A of the power split mechanism 2 via a crankshaft 11 and a damper (not shown).

The first motor generator MG1 is an alternating-current synchronous generator. The first motor generator MG1 not only functions as a generator but also functions as an electric motor. Similarly, the second motor generator MG2 is also an alternating-current synchronous generator. The second motor generator MG2 not only functions as an electric motor but also functions as a generator.

An MG1 rotation speed sensor (resolver) 106 is provided in the first motor generator MG1. An MG2 rotation speed sensor (resolver) 107 is provided in the second motor generator MG2. The MG1 rotation speed sensor 106 detects the rotation speed of a rotor (the rotation angle of an electric motor rotary shaft) of the first motor generator MG1. The MG2 rotation speed sensor 107 detects the rotation speed of a rotor (the rotation angle of an electric motor rotary shaft) of the second motor generator MG2. Output signals (rotation angle detected values) of these rotation speed sensors 106, 107 are input to the HV_ECU 100, and are used for drive control, or the like, over the motor generators MG1, MG2.

Figure 2:
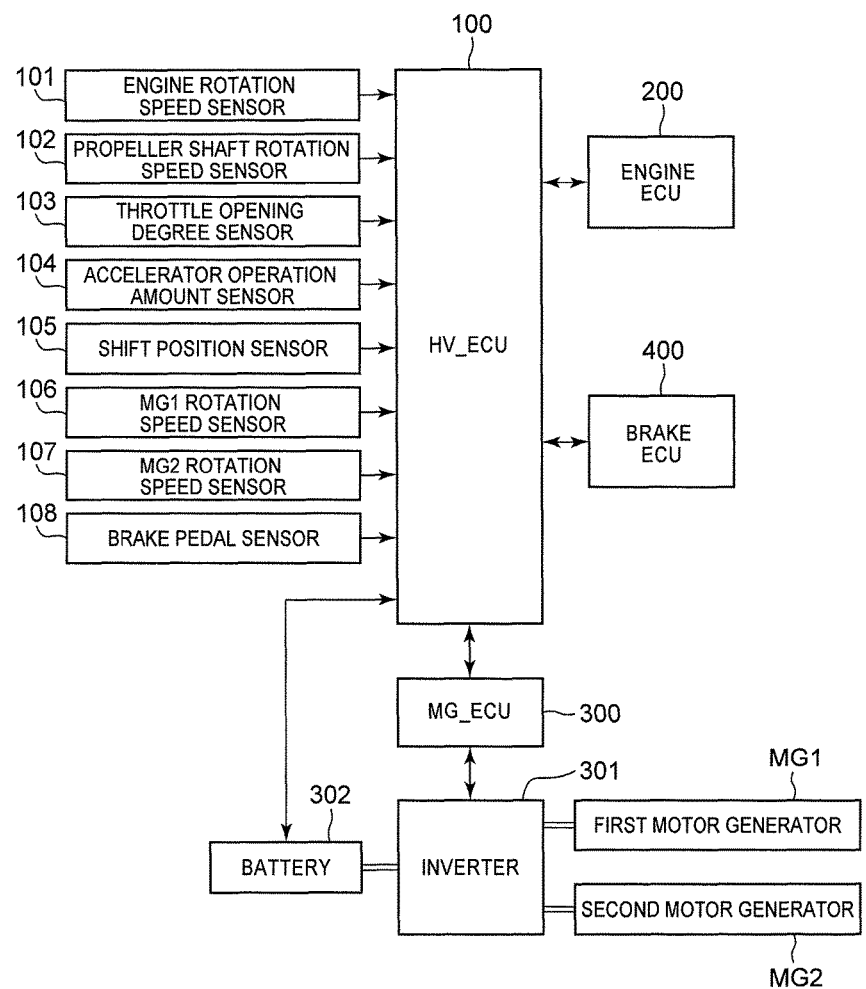
FIG. 2 is a block diagram that shows the configuration of a control system, such as an ECU.

As shown in FIG. 2, the first motor generator MG1 and the second motor generator MG2 each are connected to a battery (electrical storage device) 302 via an inverter 301. The inverter 301 is controlled by the MG_ECU 300. The MG_ECU 300 controls power motoring or regeneration of each of the motor generators MG1, MG2 by controlling the inverter 301 in response to an output power request from the HV_ECU 100.

As shown in FIG. 1, the power split mechanism 2 includes a sun gear S0, a ring gear R0, pinion gears P0 and a planetary carrier CA0. The sun gear S0 is an external gear. The ring gear R0 is an internal gear arranged concentrically with the sun gear S0. The pinion gears P0 are a plurality of gears, each of which is in mesh with these sun gear S0 and ring gear R0. The planetary carrier CA0 supports the plurality of pinion gears P0 such that the pinion gears P0 are rotatable and revolvable. The power split mechanism 2 is a planetary gear mechanism that performs differential action by using these planetary carrier CA0 (first rotating element), sun gear S0 (second rotating element) and ring gear R0 (third rotating element) as rotating elements.

In the power split mechanism 2 shown in FIG. 1, the planetary carrier CA0 is an input element, and the planetary carrier CA0 is coupled to the crankshaft 11 of the engine 1 via the input shaft 2A and the damper. The sun gear S0 is a reaction element. The rotor (rotary shaft) of the first motor generator MG1 is coupled to the sun gear S0 so as to rotate integrally. The ring gear R0 is an output element. A ring gear shaft 2B is coupled to the ring gear R0. The ring gear shaft 2B is coupled to an input shaft 3A of the transmission 3 so as to rotate integrally.

Figure 3:
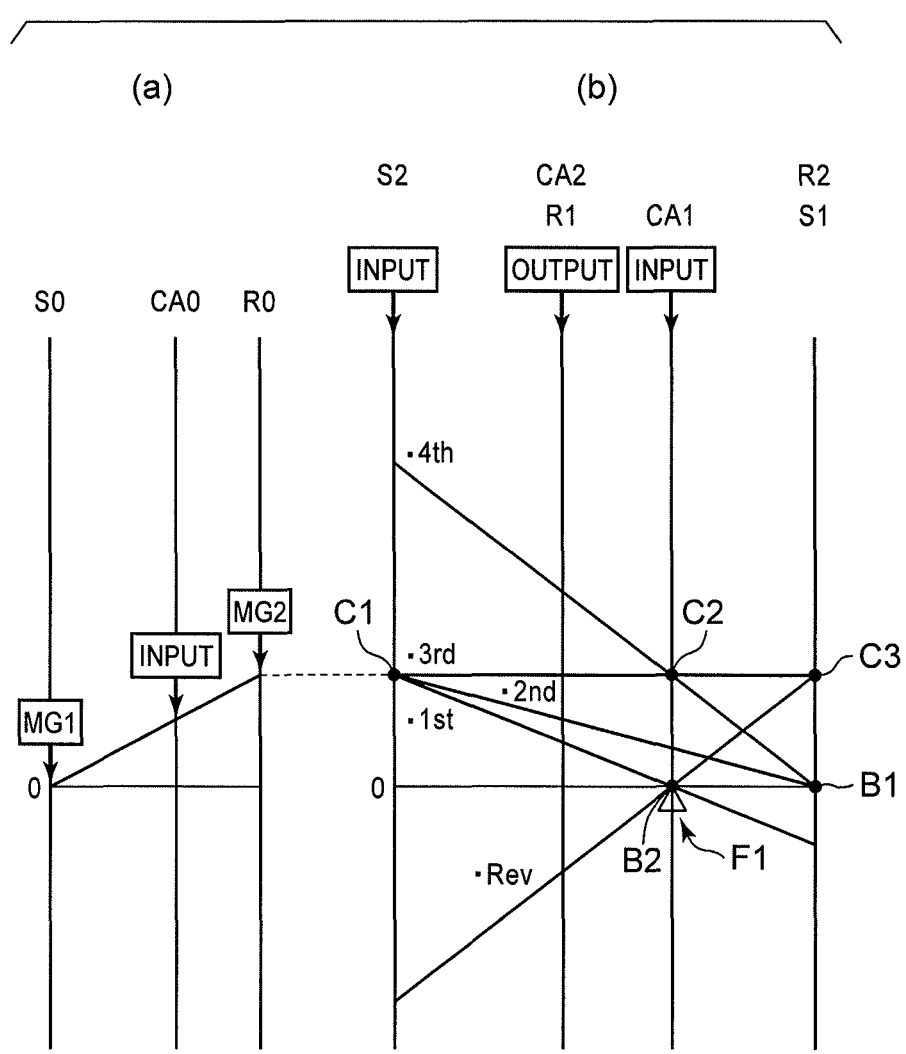
FIG. 3 shows nomographs, in which (a) is a nomograph that shows a relative relationship among rotation speeds of rotating elements of a power split mechanism and (b) is a nomograph that shows a relative relationship among rotation speeds of rotating elements of a transmission.

A nomograph for the power split mechanism 2 is shown in (a) of FIG. 3. In the nomograph in (a) of FIG. 3, the (three) vertical axes are respectively, from the left side in the drawing, an axis that represents the rotation speed of the sun gear S0 (MG1), an axis that represents the rotation speed of the planetary carrier CA0 (engine 1) and an axis that represents the rotation speed of the ring gear R0 (output). The nomograph in (a) of FIG. 3 is set such that, where the interval between the S0 axis and the CA0 axis is "1", the interval between the CA0 axis and the R0 axis becomes a gear ratio $\rho 0$ (Number of teeth ZS0 of the sun gear S0/Number of teeth ZR0 of the ring gear R0).

The transmission 3 is an automatic transmission. As shown in FIG. 1, the transmission 3 is provided in a power transmission path between the engine 1 and the drive wheels 6. The transmission 3 shifts rotational power that is input from the power split mechanism 2 to the input shaft 3A and then outputs the rotational power to an output shaft 3B. The output shaft 3B of the transmission 3 is coupled to the drive wheels 6 via the propeller shaft 4, the differential unit 5, and the like. The rotation speed of the propeller shaft 4 (hereinafter, also referred to as propeller shaft rotation speed) is detected by a propeller shaft rotation speed sensor 102. An output signal of the propeller shaft rotation speed sensor 102 is input to the HV_ECU 100.

The transmission 3 is formed of a first planetary gear mechanism 31, a second planetary gear mechanism 32, first to third clutches C1 to C3, a first brake B1, a second brake B2, a one-way clutch F1, and the like.

The first planetary gear mechanism 31 is a single-pinion gear-type planetary mechanism. The first planetary gear mechanism 31 includes a sun gear S1, a plurality of pinion gears P1 that are in mesh with the sun gear S1, a planetary carrier CA1 that supports these plurality of pinion gears P1 such that the pinion gears P1 are rotatable and revolvable, and a ring gear R1 that is in mesh with the sun gear S1 via the pinion gears P1.

Similarly, the second planetary gear mechanism 32 is a single-pinion gear-type planetary mechanism. The second planetary gear mechanism 32 includes a sun gear S2, a plurality of pinion gears P2 that are in mesh with the sun gear S2, a planetary carrier CA2 that supports the plurality of pinion gears P2 such that the pinion gears P2 are rotatable and revolvable, and a ring gear R2 that is in mesh with the sun gear S2 via the pinion gears P2.

The planetary carrier CA1 of the first planetary gear mechanism 31 is coupled to the ring gear R2 of the second planetary gear mechanism 32. The ring gear R1 is coupled to the planetary carrier CA2 of the second planetary gear mechanism 32. The sun gear S1 of the first planetary gear mechanism 31 is selectively coupled to the ring gear shaft 2B (input shaft 3A) of the power split mechanism 2 via the third clutch C3. The sun gear S1 is selectively coupled to a transmission case 30 via the first brake B1.

The planetary carrier CA1 of the first planetary gear mechanism 31 is selectively coupled to the ring gear shaft 2B (input shaft 3A) of the power split mechanism 2 via the second clutch C2. The sun gear S2 of the second planetary gear mechanism 32 is selectively coupled to the ring gear shaft 2B (input shaft 3A) of the power split mechanism 2 via the first clutch C1.

The ring gear R2 of the second planetary gear mechanism 32 is selectively coupled to the transmission case 30 via the second brake B2. The ring gear R2 and the planetary carrier CA1 of the first planetary gear mechanism 31 are coupled to the transmission case 30 via the one-way clutch F1. In addition, the planetary carrier CA2 of the second planetary gear mechanism 32 is coupled to the output shaft 3B.

An engaged or released state of each of the above-described first to third clutches C1 to C3, first brake B1 and second brake B2 is controlled by a hydraulic circuit (not shown) and the HV_ECU 100.

Figures 4, 5:
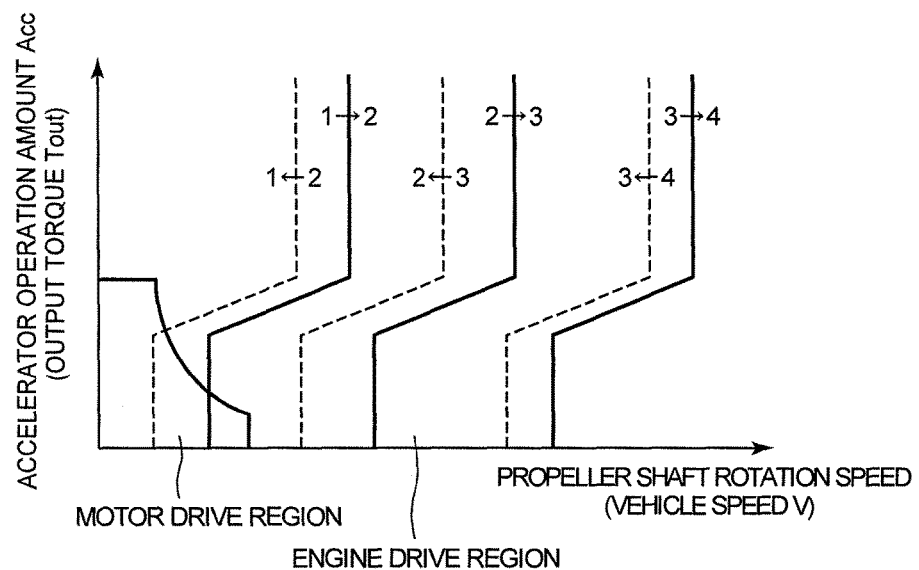
FIG. 4 is an engagement chart that shows engagement states of clutches, brakes and one-way clutch for each speed position in the transmission shown in FIG. 1.
FIG. 5 is a view that shows a shift line map.

FIG. 4 is an engagement chart that shows the relationship between an engaged or released state of each of the first to third clutches C1 to C3, first brake B1, second brake B2 and one-way clutch F1 and each of speed positions (1st to 4th, Rev, N). In the engagement chart of FIG. 4, the circle mark denotes engaged state, and the blank denotes released state.

The speed positions of the transmission 3 will be described with reference to the engagement chart of FIG. 4 and the nomograph in (b) of FIG. 3. In the nomograph in (b) of FIG. 3, the (four) vertical axes are respectively, from the left side in the drawing, the rotation speed of the sun gear S2 (input), the rotation speed of the planetary carrier CA2 and ring gear R1 (output), the rotation speed of the planetary carrier CA1 (input) and the rotation speed of the ring gear R2 and sun gear S1.

In the first speed position (1st), only the first clutch C1 and the one-way clutch F1 are placed in the engaged state. As a result of such engagement, rotation input from the sun gear S2 is reduced in speed, and is output as the rotation of the planetary carrier CA2.

In the second speed position (2nd), only the first clutch C1 and the first brake B1 are placed in the engaged state. A speed reduction ratio in this engaged state is smaller than that of the above-described first speed position.

In the third speed position (3rd), only the first clutch C1 and the second clutch C2 are placed in the engaged state. In this third speed position, the rotation of the ring gear shaft 2B (input shaft 3A) of the power split mechanism 2 is directly transmitted to the output shaft 3B. This is a so-called directly coupled state.

In the fourth speed position (4th), only the second clutch C2 and the first brake B1 are placed in the engaged state. As a result of such engagement, rotation input from the planetary carrier CA1 is increased in speed, and is then output as the rotation of the ring gear R1.

In the reverse position (Rev), only the third clutch C3 and the second brake B2 are placed in the engaged state. As a result of such engagement, rotation input from the sun gear S1 is rotated in the reverse direction, and is then output as the rotation of the ring gear R1.

In the neutral range (N), all the clutches C1 to C3 and brakes B1, B2 are placed in the released state.

The HV_ECU 100 includes a central processing unit (CPU), a read only memory (ROM), a random access memory (RAM), a backup RAM, and the like.

Various control programs, maps that are referenced at the time of executing those various control programs, and the like, are stored in the ROM. The CPU executes arithmetic processing on the basis of the various control programs and maps stored in the ROM. The RAM is a memory that temporarily stores computed results of the CPU, data input from the sensors, and the like. The backup RAM is a nonvolatile memory that stores data, and the like, that should be saved at the time of, for example, a stop of the engine 1.

In each of the engine ECU 200, the MG_ECU 300 and the brake ECU 400 as well, a CPU, a ROM, a RAM, a backup RAM, and the like, are provided. The brake ECU 400 calculates the wheel speed of each wheel on the basis of output signals of wheel speed sensors (not shown) that respectively detect the wheel speeds of the four wheels, that is, the right and left drive wheels and the right and left driven wheels (not shown).

As shown in FIG. 2, an engine rotation speed sensor 101, the propeller shaft rotation speed sensor 102, a throttle opening degree sensor 103, an accelerator operation amount sensor 104, a shift position sensor 105, the MG1 rotation speed sensor 106, the MG2 rotation speed sensor 107, a brake pedal sensor 108, and the like, are connected to the HV_ECU 100. The engine rotation speed sensor 101 detects the rotation speed (engine rotation speed) of the crankshaft 11 that is the output shaft of the engine 1. The throttle opening degree sensor 103 detects the opening degree of the throttle valve of the engine 1. The accelerator operation amount sensor 104 detects the operation amount of an accelerator pedal. The brake pedal sensor 108 detects a depression force (brake depression force) on the brake pedal. In addition, sensors that indicate the operating state of the engine 1, such as a coolant temperature sensor that detects an engine coolant temperature and an air flow meter that detects the intake air amount, are connected to the HV_ECU 100. Signals from these sensors are input to the HV_ECU 100.

The HV_ECU 100 controls driving force by transmitting command signals to the engine ECU 200, the MG_ECU 300 and the brake ECU 400 on the basis of the output signals of the above-described various sensors.

The HV_ECU 100 executes shift control over the transmission 3. Specifically, for example, the HV_ECU 100 obtains a target speed position by consulting a shift map shown in FIG. 5 on the basis of the propeller shaft rotation speed (vehicle speed V) that is obtained from the output signal of the propeller shaft rotation speed sensor 102 and the accelerator operation amount Acc (output torque Tout) that is obtained from the output signal of the accelerator operation amount sensor 104. The HV_ECU 100 compares the target speed position with the current speed position, and determines whether shift operation is required. The current speed position is detected by the shift position sensor 105. As a result of the determination, when no shift is required, the HV_ECU 100 keeps the current speed position without outputting a shift command to the hydraulic circuit of the transmission 3. The case where no shift is required is the case where the target speed position is equal to the current speed position and the speed position is appropriately set. On the other hand, when the target speed position is different from the current speed position, the HV_ECU 100 shifts the transmission 3 by outputting a shift command to the hydraulic circuit of the transmission 3 such that the target speed position is obtained.

The shift map shown in FIG. 5 is a map that uses the propeller shaft rotation speed and the accelerator operation amount Acc as parameters, and in which a plurality of regions for obtaining a proper speed position are set on the basis of those propeller shaft rotation speed and accelerator operation amount Acc. The shift map is stored in the ROM of the HV_ECU 100. A plurality of shift lines for defining the regions are set in the shift map. The plurality of shift lines for defining the regions are upshift lines and downshift lines for defining 1st to 4th speed regions.

In addition, the HV_ECU 100 is able to execute shift prohibition control and lower limit speed ratio control, which will be described below.

A control apparatus for a vehicle according to the present disclosure includes the accelerator operation amount sensor 104, the brake pedal sensor 108, the propeller shaft rotation speed sensor 102, the brake ECU 400, the HV_ECU 100, and the like.

Next, shift prohibition control that is executed by the HV_ECU 100 will be described below. Shift prohibition control is control for prohibiting a shift of the transmission 3 when it is determined that a wheel spin has occurred.

Initially, wheel spin determination in the case where it is determined that a wheel spin has occurred will be described. In the following description, determination in the case where it is determined that a wheel spin has occurred is referred to as affirmative wheel spin determination.

The HV_ECU 100 carries out a determination as to a wheel spin. A determination as to a wheel spin is carried out by using a wheel vehicle speed and a vehicle body speed. The wheel vehicle speed is a vehicle body speed that is converted on the basis of the wheel speeds.

Specifically, the HV_ECU 100 calculates a wheel speed by using the propeller shaft rotation speed that is obtained from the output signal of the propeller shaft rotation speed sensor 102, and the differential ratio of the differential unit 5, and then converts the wheel speed [rpm] to the wheel vehicle speed [km/h]. The wheel speed is allowed to be calculated by the following mathematical expression (1). The wheel vehicle speed is allowed to be calculated by the following mathematical expression (2).

$$\text{Wheel speed [rpm]} = \text{Propeller shaft rotation speed} \div \text{Differential ratio} \qquad (1)$$

$$\text{Wheel vehicle speed} = \text{Wheel speed} \times 2\pi \times (\text{Tire radius [m]}/1000) \times 60 \qquad (2)$$

As for the vehicle body speed, the HV_ECU 100 calculates the vehicle body speed [km/h] by using the lowest wheel speed (rpm) or the second lowest wheel speed (rpm) among the wheel speeds of the four wheels, which are calculated by the brake ECU 400. When the wheels lock as a result of sudden brake, the corresponding wheel speeds suddenly become zero; however, the vehicle body speed is limited by a guard value such that the vehicle body speed does not suddenly decrease by a predetermined amount or more, so the vehicle body speed does not suddenly become zero. The guard value is a value of vehicle body speed, set in advance by experiment, simulation, or the like.

The HV_ECU 100 makes affirmative wheel spin determination when the thus calculated wheel vehicle speed is higher than the vehicle body speed and the difference between the wheel vehicle speed and the vehicle body speed is larger than or equal to a predetermined value Tha1. That is, the HV_ECU 100 determines that a wheel spin has occurred. In the following description, the difference between the wheel vehicle speed and the vehicle body speed is referred to as slip speed.

When the HV_ECU 100 determines that a wheel spin has occurred, the HV_ECU 100 executes shift prohibition control.

Next, determination in the case where shift prohibition control is cancelled will be described. In the following description, determination in the case where shift prohibition control is cancelled is referred to as negative wheel spin determination.

The negative wheel spin determination is also carried out by using the wheel vehicle speed [km/h] and the vehicle body speed [km/h]. Specifically, as well as the above-described process, the HV_ECU 100 calculates the wheel vehicle speed and the vehicle body speed. When the calculated wheel vehicle speed is higher than the vehicle body speed and a predetermined time has elapsed from the time at which the difference between the wheel vehicle speed and the vehicle body speed becomes lower than or equal to a predetermined value Tha2, the HV_ECU 100 makes negative wheel spin determination. That is, the HV_ECU 100 determines that a condition for cancelling shift prohibition control is satisfied. The time at which the slip speed becomes lower than or equal to the predetermined value Tha2 is the time at which a wheel spin falls within a predetermined range.

The predetermined value Tha2 that is used for negative wheel spin determination and the predetermined value Tha1 that is used for the above-described affirmative wheel spin determination may be the same value. However, in order to avoid hunting of the affirmative wheel spin determination and the negative wheel spin determination, it is desirable that the predetermined value Tha2 that is used for negative wheel spin determination be made smaller than the predetermined value Tha1 that is used for affirmative wheel spin determination (Tha1>Tha2).

In negative wheel spin determination, the HV_ECU 100 makes negative wheel spin determination when the predetermined time has elapsed from the time at which the slip speed becomes lower than or equal to the predetermined value Tha2. The reason is as follows.

That is, because the vehicle body speed under wheel spin is not accurate, if negative wheel spin determination is made at the time at which the slip speed becomes lower than or equal to the predetermined value Tha2, the negative wheel spin determination is made in a state where a wheel spin is not completely eliminated. For this reason, there is a possibility of erroneous determination. In order to eliminate such inconvenience, the HV_ECU 100 makes negative wheel spin determination when the predetermined time has elapsed from the time at which the slip speed becomes lower than or equal to the predetermined value Tha2. The predetermined time is a time corresponding to a time that is required to completely eliminate a wheel spin. Through such condition settings, the HV_ECU 100 appropriately determines that shift prohibition control is reliably cancelled. The predetermined time is determined by experiment, simulation, or the like.

Depending on the condition for cancelling shift prohibition control, there is a higher possibility that a request to execute shift prohibition control and a request to execute lower limit speed ratio control overlap with each other. The cancellation condition is a condition that the predetermined time has elapsed from the time at which the slip speed becomes lower than or equal to the predetermined value Tha2.

Next, a specific example of shift prohibition control will be described with reference to the timing chart of FIG. 6.

Initially, when the accelerator is depressed and driving force (driving torque) is output in a state where the gear position of the transmission 3 is 1st (when the vehicle starts moving) on a low μ road, a wheel spin occurs. The HV_ECU 100 makes affirmative wheel spin determination when the slip speed becomes higher than or equal to the predetermined value Tha1. If the propeller shaft rotation speed (wheel vehicle speed) steeply increases under this wheel spin to intersect with 1st-to-2nd upshift line of the shift map shown in FIG. 5 and, as a result, the gear position of the transmission 3 is shifted into 2nd (in the case of the dashed line in FIG. 6), torque during the shift deviates from a wheel spin limitation required driving torque. That is, intended torque control is not executed (A1 in FIG. 6). Once in such a situation, the slip speed cannot be controlled as intended (B1 in FIG. 6). The wheel spin limitation required driving torque is a limited torque for preventing an overspeed.

Figure 6:
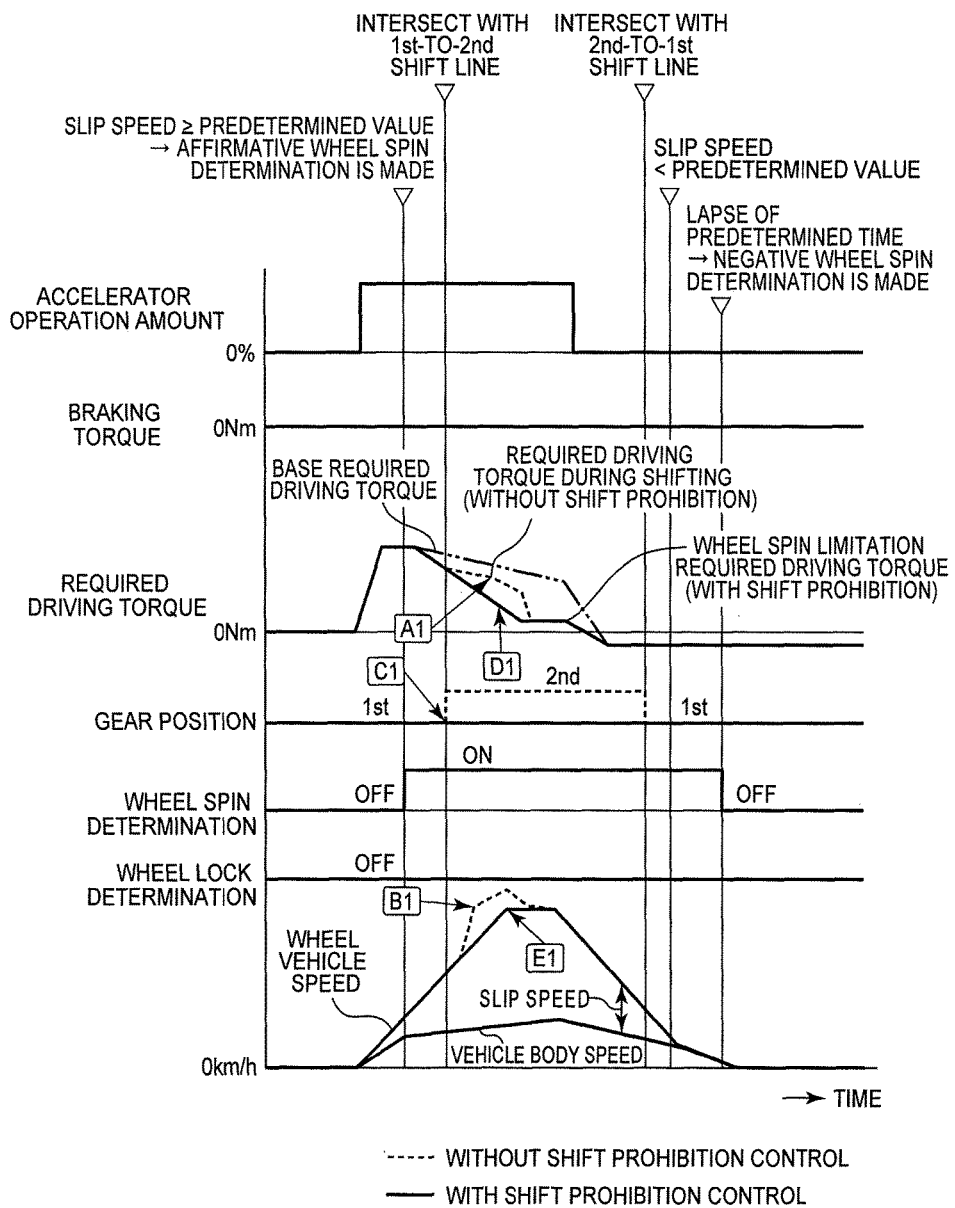
FIG. 6 is a timing chart that shows an example of shift prohibition control.

In consideration of such inconvenience, the HV_ECU 100 according to the present embodiment executes shift prohibition control even when there is a shift request under wheel spin, that is, under affirmative wheel spin determination, and prohibits a shift of the transmission 3 (C1 in FIG. 6). Thus, the HV_ECU 100 executes intended torque control (D1 in FIG. 6), and allows control over the slip speed (E1 in FIG. 6).

Next, lower limit speed ratio control that is executed by the HV_ECU 100 will be described. Lower limit speed ratio control is control for limiting a lower limit speed ratio of the transmission 3 in response to the vehicle body speed in the case where it is determined that a wheel lock has occurred.

Initially, wheel lock determination will be described.

The HV_ECU 100 carries out a determination as to a wheel lock. The determination as to a wheel lock will be described. In the following description, determination in the case where it is determined that a wheel lock has occurred is referred to as affirmative wheel lock determination.

Initially, as described above, when the wheels lock as a result of sudden brake, the wheel speeds suddenly become zero; however, the vehicle body speed is limited by a guard value such that the vehicle body speed does not suddenly decrease by a predetermined amount or more, so the vehicle body speed does not suddenly become zero. By utilizing such a point, the HV_ECU 100 makes affirmative wheel lock determination when the wheel vehicle speed (wheel speed) decreases and a speed difference (negative value) between the wheel vehicle speed and the guard value for the vehicle body speed is smaller than or equal to a predetermined value Thb1. That is, it is determined that a wheel lock has occurred. The wheel vehicle speed is calculated as in the case of the above-described process.

When the HV_ECU 100 determines that a wheel lock has occurred, the HV_ECU 100 executes lower limit speed ratio control.

Next, determination in the case where lower limit speed ratio control is cancelled will be described. In the following description, determination in the case where lower limit speed ratio control is cancelled is referred to as negative wheel lock determination. In the negative wheel lock determination, after the HV_ECU 100 makes affirmative wheel lock determination, the HV_ECU 100 makes negative wheel lock determination when the wheel vehicle speed increases and a predetermined time has elapsed from the time at which the speed difference (negative value) between the wheel vehicle speed and the guard value for the vehicle body speed becomes larger than or equal to a predetermined value Thb2. That is, the HV_ECU 100 determines that a condition for cancelling lower limit speed ratio control is satisfied.

The predetermined value Thb2 that is used for negative wheel lock determination and the predetermined value Thb1 that is used for the above-described affirmative wheel lock determination may be the same value. However, in order to avoid hunting of the affirmative wheel lock determination and the negative wheel lock determination, it is desirable that the predetermined value Thb2 that is used for negative wheel lock determination be made smaller than the predetermined value Thb1 that is used for affirmative wheel lock determination (Thb1>Thb2).

In the negative wheel lock determination, negative wheel lock determination is made when the predetermined time has elapsed from the time at which the speed difference (negative value) between the wheel vehicle speed and the guard value for the vehicle body speed becomes larger than or equal to the predetermined value Thb2. The reason is as follows.

That is, when negative wheel lock determination is made at the time when the speed difference (negative value) between the wheel vehicle speed and the guard value for the vehicle body speed becomes larger than or equal to the predetermined value Thb2, negative wheel lock determination is made in a state where a wheel lock is not completely eliminated. For this reason, there is a possibility of erroneous determination. In order to eliminate such inconvenience, the HV_ECU 100 makes negative wheel lock determination when the predetermined time has elapsed from the time at which the speed difference becomes larger than or equal to the predetermined value Thb2. That is, the condition for cancelling lower limit speed ratio control is satisfied. The predetermined time is a time corresponding to a time that is required to completely eliminate a wheel lock. Through such condition settings, the HV_ECU 100 appropriately determines that lower limit speed ratio control is reliably cancelled. The predetermined time is determined by experiment, simulation, or the like.

Depending on the condition for cancelling lower limit speed ratio control, there is a higher possibility that a request to execute lower limit speed ratio control and a request to execute shift prohibition control overlap with each other. The cancellation condition is a condition that the predetermined time has elapsed from the time at which the speed difference (negative value) between the wheel vehicle speed and the guard value for the vehicle body speed under wheel lock becomes larger than or equal to the predetermined value Thb2.

Figure 7:
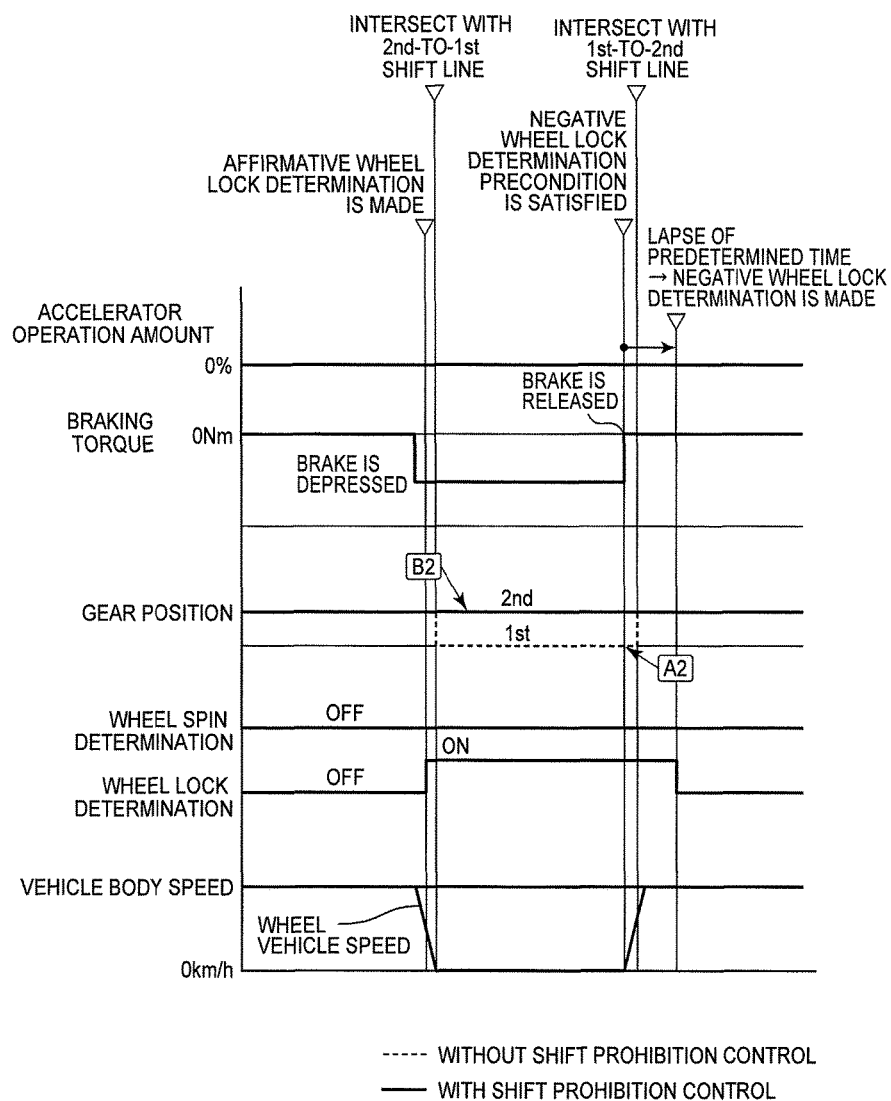
FIG. 7 is a timing chart that shows an example of lower limit speed ratio control.

A specific example of lower limit speed ratio control will be described with reference to the timing chart of FIG. 7.

Initially, when large braking torque (negative torque) is generated through brake depression while the vehicle is traveling on a low μ road in a state where the gear position of the transmission 3 is 2nd, a wheel lock occurs. That is, affirmative wheel lock determination is made. If the propeller shaft rotation speed (wheel vehicle speed) steeply decreases under the wheel lock (the vehicle body speed is constant) to intersect with 2nd-to-1st downshift line of the shift map shown in FIG. 5 and, as a result, the gear position is shifted into 1st (see the dashed line shown in FIG. 7), the brake is released (Braking torque=0 Nm), and tire grip recovers. Then, the propeller shaft rotation speed (wheel vehicle speed) steeply increases to intersect with the 1st-to-2nd upshift line of the shift map shown in FIG. 5 (A2 in FIG. 7). At this time, actually, the established gear position remains in 1st due to a delay of a timer or a delay of hydraulic pressure response from shift determination to shift command output, so there is a possibility that the input shaft rotation speed (MG2 rotation speed) of the transmission 3 steeply increases and, as a result, an overspeed occurs. The shift determination is that the propeller shaft rotation speed intersects with the 1st-to-2nd upshift line.

In order to eliminate such inconvenience, lower limit speed ratio control is executed. That is, under wheel lock, it is possible to prevent an overspeed of the input shaft 3A of the transmission 3 at the time of recovery of tire grip by limiting a lower limit gear position to 2nd (B2 in FIG. 7).

In lower limit speed ratio control, the lower limit gear position for performing lower limit guard is set in response to the vehicle body speed. Specifically, when the vehicle body speed at the time of recovery of tire grip resulting from brake release is such a vehicle body speed that the overspeed occurs when the gear position of the transmission 3 is 1st, the lower limit gear position is set to 2nd. When the vehicle body speed at the time of recovery of tire grip resulting from brake release is high is such a vehicle body speed that the overspeed occurs when the gear position of the transmission 3 is 2nd, the lower limit gear position is set to 3rd. In addition, when the vehicle body speed at the time of recovery of tire grip resulting from brake release is high and is such a vehicle body speed that the overspeed occurs when the gear position of the transmission 3 is 3rd, the lower limit gear position is set to 4th.

Next, an example in the case where shift prohibition control is given a higher priority in control for executing shift prohibition control and lower limit speed ratio control will be described with reference to the timing chart of FIG. 8.

Initially, when the accelerator pedal is depressed by a large amount while the vehicle is traveling (the accelerator operation amount is constant) in a state where the gear position of the transmission 3 is 1st, the wheel vehicle speed (propeller shaft rotation speed) steeply increases, and, as a result, a wheel spin occurs. When the slip speed becomes larger than or equal to the predetermined value Tha1, affirmative wheel spin determination is made. When the propeller shaft rotation speed (wheel vehicle speed) intersects with the 1st-to-2nd upshift line of the shift map shown in FIG. 5 under wheel spin, the gear position of the transmission 3 is originally shifted into 2nd (see the dashed line in FIG. 8); however, when shift prohibition control is given a higher priority, a shift is prohibited under wheel spin, so the gear position of the transmission 3 is kept in 1st (A3 in FIG. 8).

Figure 8:
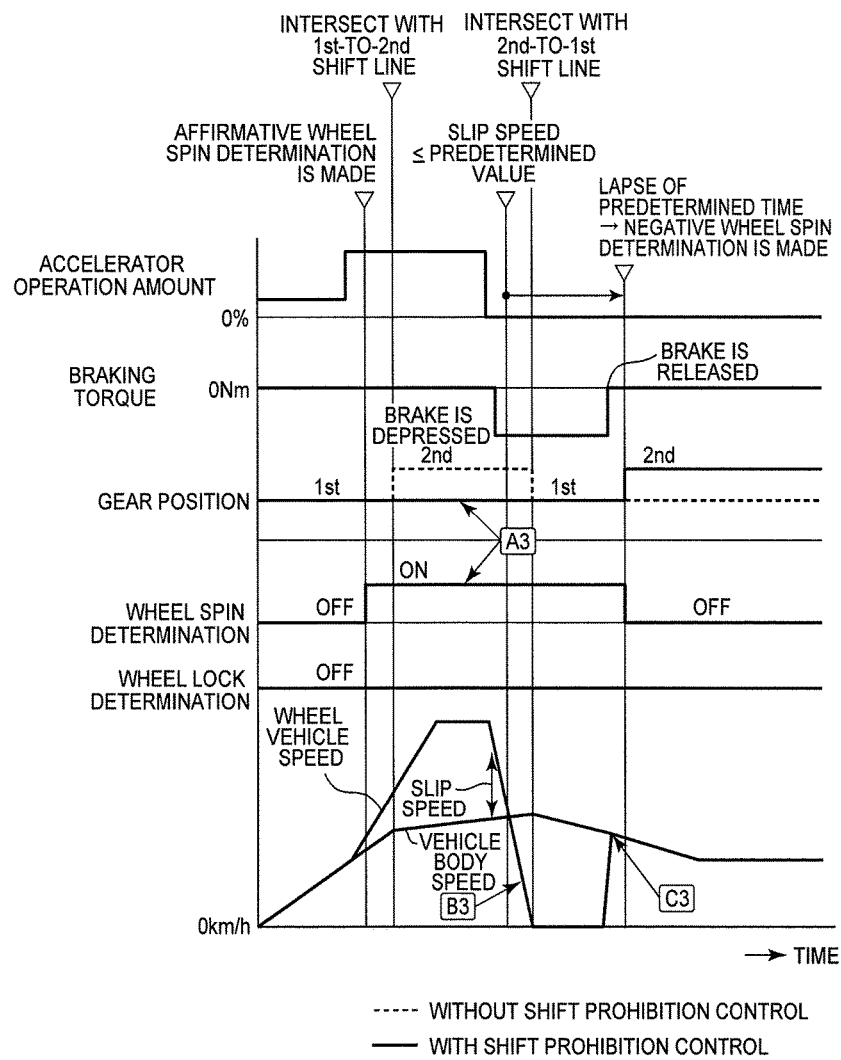
FIG. 8 is a timing chart that shows an example of control that gives a higher priority to shift prohibition control.

After that, by the time negative wheel spin determination is made, when large braking torque occurs as a result of brake depression and, as a result, a wheel lock occurs, the wheel vehicle speed steeply decreases (B3 in FIG. 8). After brake depression, when the brake is released and, as a result, tire grip recovers, the wheel vehicle speed steeply increases (C3 in FIG. 8). At this time, when the gear position of the transmission 3 remains in 1st due to continuation of shift prohibition control, there is a concern that an overspeed of the input shaft 3A of the transmission 3 occurs. In order to prevent such an overspeed, lower limit speed ratio control is preferentially executed, and the gear position of the transmission 3 at the time of a wheel spin should be increased. That is, the gear position should be limited to 2nd.

Next, a specific example of control for preferentially executing lower limit speed ratio control will be described with reference to the flowchart shown in FIG. 9. The control routine shown in FIG. 9 is repeatedly executed in the HV_ECU 100 at intervals of a predetermined time.

Figure 9:
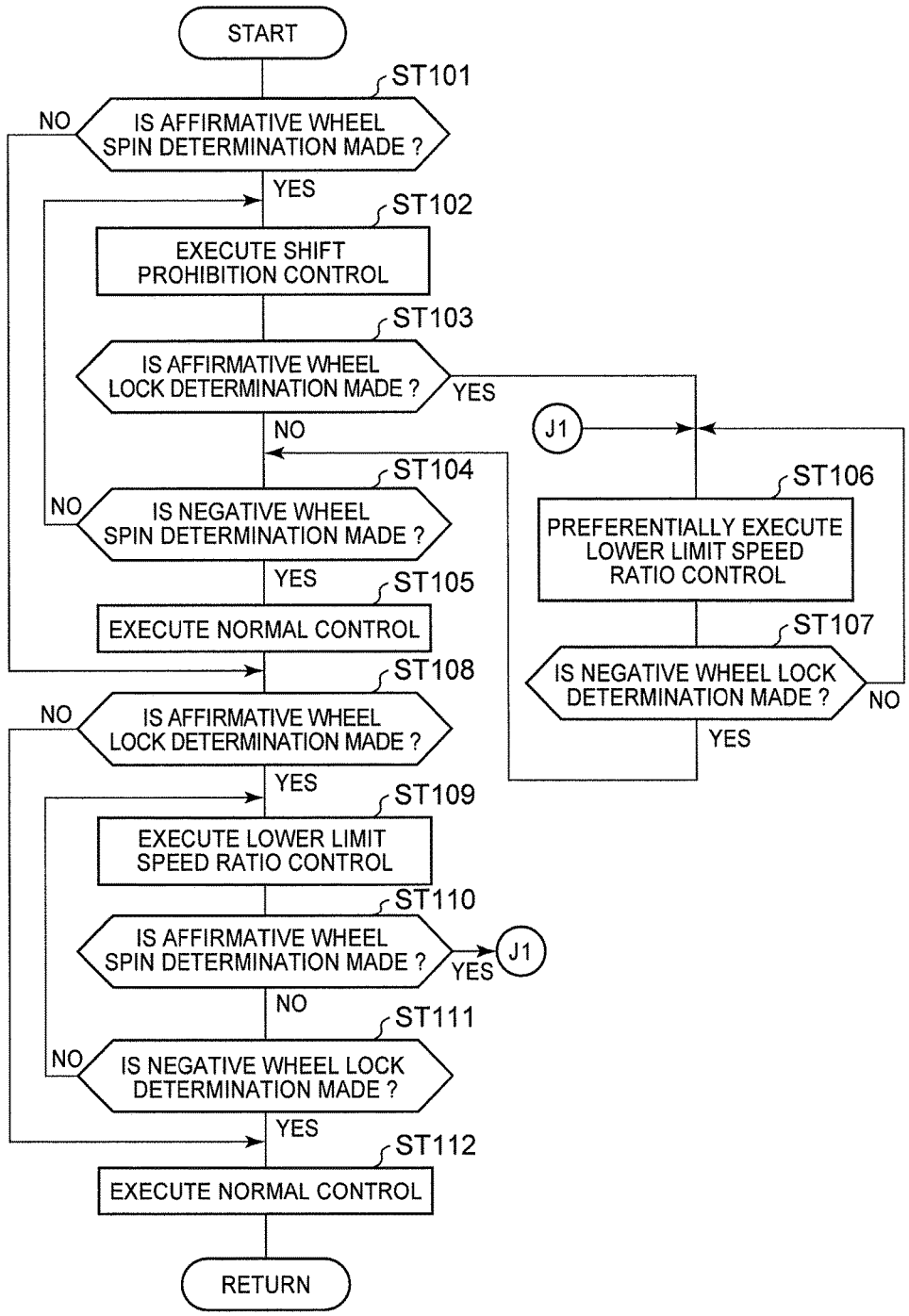
FIG. 9 is a flowchart that shows an example of control that gives a higher priority to lower limit speed ratio control.

As the control routine shown in FIG. 9 is started, the HV_ECU 100 determines in step ST101 through the above-described wheel spin determination process whether affirmative wheel spin determination is made. When affirmative determination is made (YES) in step ST101, the HV_ECU 100 proceeds to step ST102. That is, when it is determined that a wheel spin has occurred, the HV_ECU 100 proceeds to step ST102.

In step ST102, the HV_ECU 100 executes shift prohibition control.

In step ST103, the HV_ECU 100 determines through the above-described wheel lock determination process whether affirmative wheel lock determination is made. When negative determination is made (NO) in step ST103, the HV_ECU 100 proceeds to step ST104.

In step ST104, the HV_ECU 100 determines through the above-described wheel spin determination process whether negative wheel spin determination is made. When affirmative determination is made (YES) in step ST104, the HV_ECU 100 proceeds to step ST105. That is, when the condition for cancelling shift prohibition control is satisfied, the HV_ECU 100 proceeds to step ST105. When negative determination is made (NO) in step ST104, the HV_ECU 100 returns to step ST102 and continues shift prohibition control. The shift prohibition control ends when affirmative determination is made (YES) in step ST103 or when affirmative determination is made (YES) in step ST104.

At the time when affirmative determination is made (YES) in step ST104, the HV_ECU 100 proceeds to step ST105, shifts from shift prohibition control to normal control, and then proceeds to step ST108. Normal control is control for shifting the transmission 3 by consulting the shift map shown in FIG. 5 on the basis of the propeller shaft rotation speed that is obtained from the output signal of the propeller shaft rotation speed sensor 102.

When affirmative determination is made (YES) in step ST103, that is, when affirmative wheel lock determination is made before negative wheel spin determination is made, the HV_ECU 100 preferentially executes lower limit speed ratio control (step ST106). The lower limit speed ratio control is continuously executed until affirmative determination is made (YES) in step ST107. That is, the lower limit speed ratio control is continuously executed until negative wheel lock determination is made through the above-described wheel lock determination process. At the time when affirmative determination is made (YES) in step ST107, the HV_ECU 100 ends lower limit speed ratio control and returns to step ST104.

On the other hand, when negative determination is made (N0) in step ST101, the HV_ECU 100 proceeds to step ST108. That is, when affirmative wheel spin determination is not made, the HV_ECU 100 proceeds to step ST108. In step ST108, the HV_ECU 100 determines through the above-described wheel lock determination process whether affirmative wheel lock determination is made. When negative determination is made (NO) in step ST108, the HV_ECU 100 executes normal control in step ST112 and then returns. When affirmative determination is made (YES) in step ST108, the HV_ECU 100 proceeds to step ST109. That is, when it is determined that a wheel lock has occurred, the HV_ECU 100 proceeds to step ST109.

In step ST109, the HV_ECU 100 executes lower limit speed ratio control.

In step ST110, the HV_ECU 100 determines through the above-described wheel spin determination process whether affirmative wheel spin determination is made. When negative determination is made (NO) in step ST110, the HV_ECU 100 proceeds to step ST111.

In step ST111, the HV_ECU 100 determines through the above-described wheel lock determination process whether negative wheel lock determination is made. When affirmative determination is made (YES) in step ST111, the HV_ECU 100 proceeds to step ST112. That is, when the condition for cancelling lower limit speed ratio control is satisfied, the HV_ECU 100 proceeds to step ST112. When negative determination is made (NO) in step ST111, the HV_ECU 100 returns to step ST109, and continues lower limit speed ratio control. The lower limit speed ratio control ends when affirmative determination is made (YES) in step ST111.

When affirmative determination is made (YES) in step ST110, that is, even when affirmative wheel spin determination is made before negative wheel lock determination is made, the HV_ECU 100 preferentially executes lower limit speed ratio control (step ST106).

Figure 10:
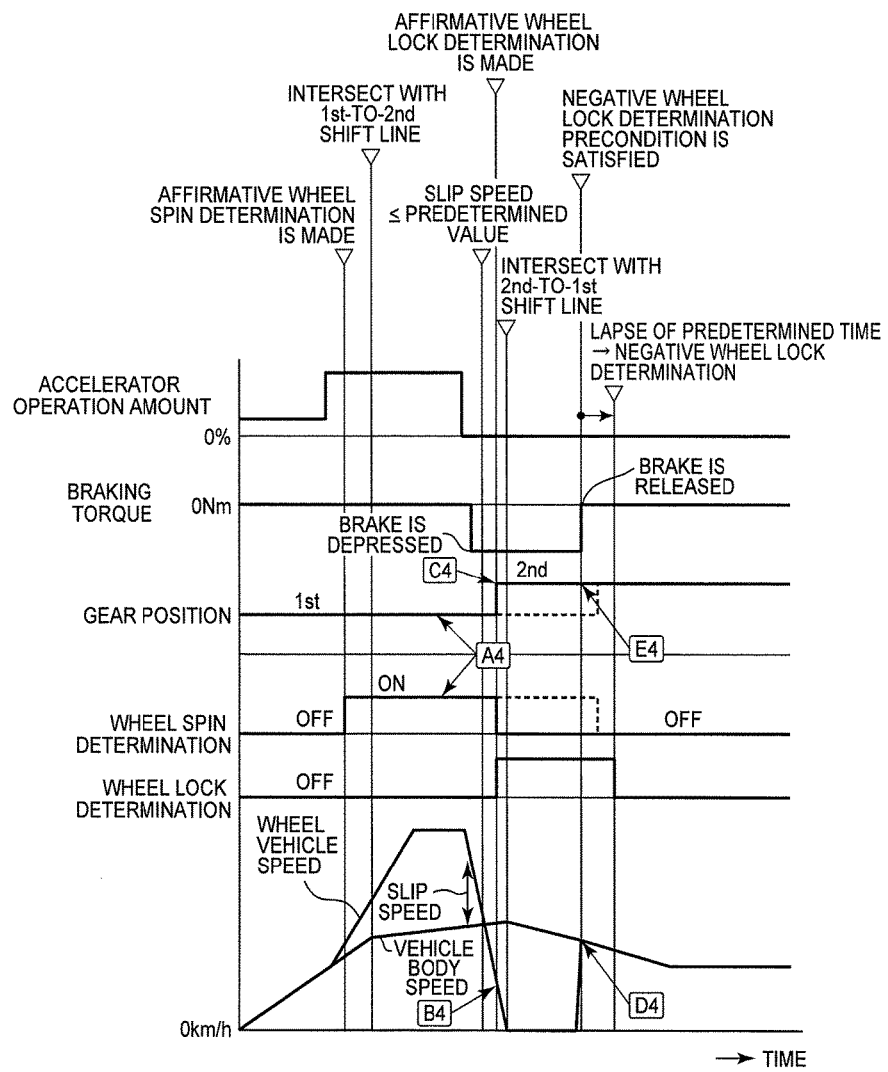
FIG. 10 is a timing chart that shows an example of control that gives a higher priority to lower limit speed ratio control.

Next, a specific example of control for giving a higher priority to lower limit speed ratio control will be described with reference to the timing chart shown in FIG. 10 and the flowchart shown in FIG. 9.

Initially, the accelerator pedal is depressed by a large amount while the vehicle is traveling in a state where the gear position of the transmission 3 is 1st, the wheel vehicle speed rapidly increases, and, as a result, a wheel spin occurs. When the slip speed becomes larger than or equal to the predetermined value Tha1, affirmative wheel spin determination is made, shift prohibition control is started, and a shift of the transmission 3 is prohibited.

Subsequently, even when the propeller shaft rotation speed intersects with the 1st-to-2nd upshift line of the shift map shown in FIG. 5 under wheel spin, because a shift of the transmission 3 is prohibited under wheel spin, the gear position is kept in 1st (A4 in FIG. 10).

After that, by the time negative wheel spin determination is made, when large braking torque is generated as a result of brake depression and a wheel lock occurs and, as a result, affirmative wheel lock determination is made, lower limit speed ratio control is preferentially executed (step ST106 in FIG. 9). Through the lower limit speed ratio control, the gear position of the transmission 3 is limited to 2nd. That is, the vehicle body speed under wheel spin is such a vehicle body speed that there is a concern about an overspeed of the input shaft 3A of the transmission 3 when the gear position of the transmission 3 is 1st, so the lower limit gear position is limited to 2nd that is the gear position commensurate with the vehicle body speed.

After brake depression, when the brake is released and, as a result, tire grip recovers, the wheel vehicle speed steeply increases (D4 in FIG. 10); however, the gear position of the transmission 3 is limited to 2nd (E4 in FIG. 10), so there is no concern that an overspeed occurs in the input shaft 3A of the transmission 3.

Figure 11:
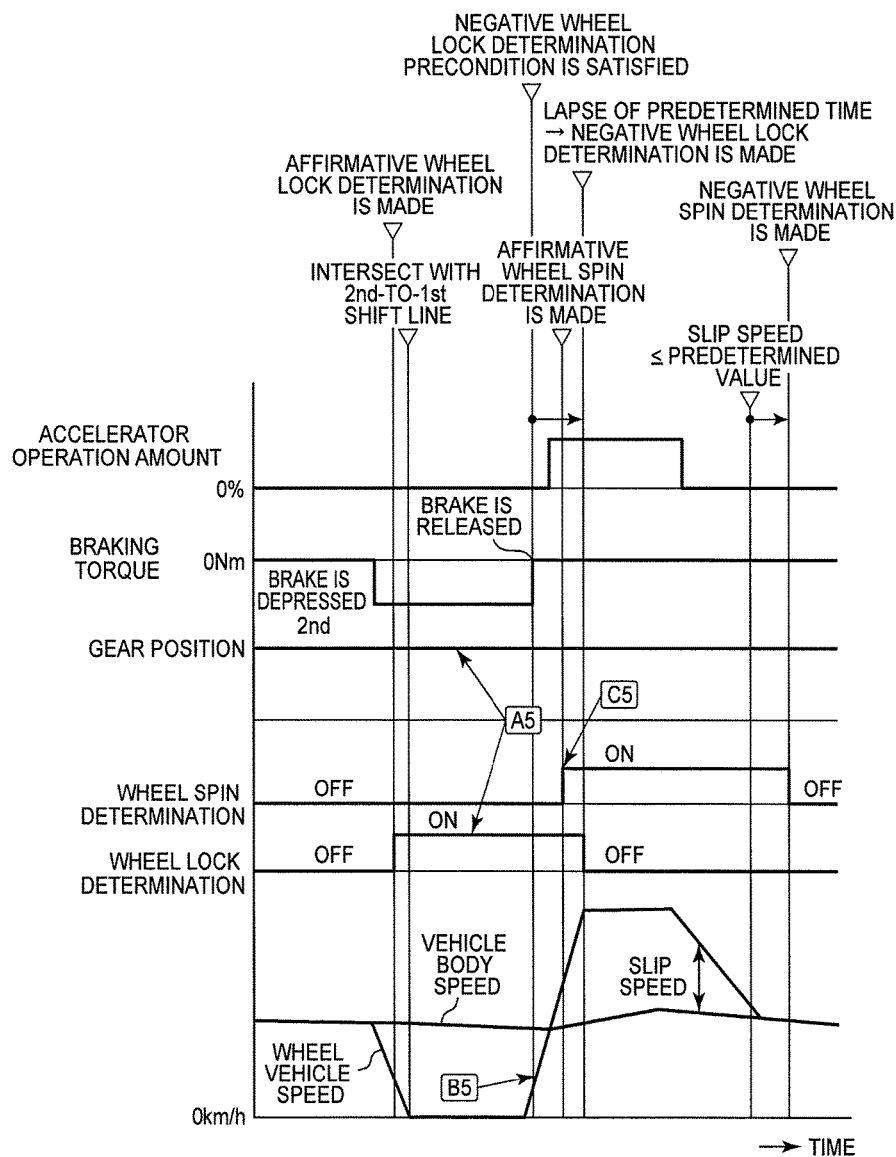
FIG. 11 is a timing chart that shows another example of control that gives a higher priority to lower limit speed ratio control.

Next, another specific example of control for giving a higher priority to lower limit speed ratio control will be described with reference to the timing chart shown in FIG. 11 and the flowchart shown in FIG. 9.

Initially, when large braking torque (negative torque) is generated as a result of brake depression while the vehicle is traveling in a state where the gear position of the transmission 3 is 2nd, a wheel lock occurs and, as a result, affirmative wheel lock determination is made, lower limit speed ratio control is executed (step ST109 in FIG. 9). The gear position of the transmission 3 is limited to 2nd through lower limit speed ratio control (A5 in FIG. 11).

Subsequently, even when the propeller shaft rotation speed steeply decreases due to a wheel lock and, as a result, intersects with the 2nd-to-1st downshift line of the shift map shown in FIG. 5, the gear position of the transmission 3 is kept in 2nd through lower limit speed ratio control. After that, by the time negative wheel lock determination is made, even when affirmative wheel spin determination is made (C5 in FIG. 11), lower limit speed ratio control is preferentially executed (step ST106). Thus, an unnecessary 2nd-to-1 st downshift after affirmative wheel lock determination is made is not output any more, so the gear position of the transmission 3 at the time when the wheel vehicle speed (propeller shaft rotation speed) steeply increases (B5 in FIG. 11) due to brake release is allowed to be set to 2nd. Thus, there is no concern that an overspeed occurs in the input shaft 3A of the transmission 3 at the time when tire grip recovers.

The embodiment described above is illustrative and not restrictive in all respect. Therefore, the technical scope of the present disclosure should not be interpreted by only the above-described embodiment, and is defined on the basis of the appended claims. The technical scope of the present disclosure encompasses equivalents to the appended claims and all modifications within the scope of the appended claims.

For example, in the above-described shift prohibition control, when affirmative wheel spin determination is made before the start of the inertia phase during a shift of the transmission 3 or when an elapsed time from the start of the inertia phase is shorter than a predetermined time or when a pre-shift synchronization rotation speed is lower than or equal to a predetermined value, control for returning the gear position to a pre-shift gear position may be executed.

In the above-described embodiment, affirmative wheel spin determination is made when the slip speed is higher than or equal to the predetermined value Tha1 (affirmative wheel spin determination condition a1); however, the present disclosure is not limited to this configuration.

As for affirmative wheel spin determination, when the rate of change in MG2 rotation speed that is obtained from the output signal of the MG2 rotation speed sensor 107 or the rate of change in propeller shaft rotation speed (wheel vehicle speed) that is obtained from the output signal of the propeller shaft rotation speed sensor 102 is positive, and when the rate of change is larger than or equal to a predetermined value (affirmative wheel spin determination condition a2), affirmative wheel spin determination may be made. Affirmative wheel spin determination may be carried out by combining the affirmative wheel spin determination condition a1 with the affirmative wheel spin determination condition a2.

In the above-described embodiment, when the predetermined time has elapsed from the time at which the slip speed becomes lower than or equal to the predetermined value Tha2 (negative wheel spin determination condition b1), negative wheel spin determination is made; however, the present disclosure is not limited to this configuration.

As for negative wheel spin determination as well, when the rate of change in MG2 rotation speed that is obtained from the output signal of the MG2 rotation speed sensor 107 or the rate of change in propeller shaft rotation speed (wheel vehicle speed) that is obtained from the output signal of the propeller shaft rotation speed sensor 102 is positive, and when a predetermined time has elapsed from the time at which the rate of change becomes smaller than or equal to a predetermined value (negative wheel spin determination condition b2), negative wheel spin determination may be made. Negative wheel spin determination may be carried out by combining the negative wheel spin determination condition b1 with the negative wheel spin determination condition b2.

In the above-described embodiment, when the speed difference between the wheel vehicle speed and the guard value for the vehicle body speed under wheel lock is smaller than or equal to the predetermined value Thb1 (affirmative wheel lock determination condition c1), affirmative wheel lock determination is made; however, the present disclosure is not limited to this configuration.

As for affirmative wheel lock determination, when the rate of change in MG2 rotation speed that is obtained from the output signal of the MG2 rotation speed sensor 107 or the rate of change in propeller shaft rotation speed (wheel vehicle speed) that is obtained from the output signal of the propeller shaft rotation speed sensor 102 is negative, and when the rate of change is smaller than or equal to a predetermined value (affirmative wheel lock determination condition c2), affirmative wheel spin determination may be made. Affirmative wheel lock determination may be made when the brake is depressed (affirmative wheel lock determination condition c3) or affirmative wheel lock determination may be made when braking torque (negative torque) is smaller than or equal to a predetermined value (affirmative wheel lock determination condition c4).

In addition, affirmative wheel lock determination may be carried out by combining the affirmative wheel lock determination condition c1, the affirmative wheel lock determination condition c2, the affirmative wheel lock determination condition c3 and the affirmative wheel lock determination condition c4 with each other.

In the above-described embodiment, when the predetermined time has elapsed from the time at which the speed difference between the wheel vehicle speed and the guard value for the vehicle body speed under wheel lock becomes larger than or equal to the predetermined value Thb2 (negative wheel lock determination condition d1), negative wheel spin determination is made; however, the present disclosure is not limited to this configuration.

As for negative wheel lock determination as well, when the rate of change in MG2 rotation speed that is obtained from the output signal of the MG2 rotation speed sensor 107 or the rate of change in propeller shaft rotation speed (wheel vehicle speed) that is obtained from the output signal of the propeller shaft rotation speed sensor 102 is negative, and when a predetermined time has elapsed from when the rate of change becomes larger than or equal to a predetermined value (negative wheel lock determination condition d2), negative wheel spin determination may be made. Negative wheel lock determination may be made when a predetermined time has elapsed from the time at which braking torque (negative torque) becomes larger than or equal to a predetermined value (negative wheel lock determination condition d3). Negative wheel lock determination may be carried out by combining the negative wheel lock determination condition d1, the negative wheel lock determination condition d2, the negative wheel lock determination condition d3 and the negative wheel lock determination condition d4 with one another.

In the above-described embodiment, a stepped (planetary gear) automatic transmission that sets a gear position by using the friction engagement devices, such as the clutches and the brakes, and the planetary gear trains as the transmission 3; however, the present disclosure is not limited to this configuration. A continuously variable transmission (CVT) that steplessly adjusts a speed ratio may be used.

In the above-described embodiment, an example in which the present disclosure is applied to control over a front-engine front-drive (FF) hybrid vehicle is described; however, the present disclosure is not limited to this configuration. The present disclosure may be applied to a front-engine rear-drive (FR) hybrid vehicle or a four-wheel-drive hybrid vehicle.

In the above-described embodiment, an example in which the present disclosure is applied to control over a hybrid vehicle including motor generators and an engine as driving force sources is described; however, the present disclosure is not limited to this configuration. The present disclosure may be applied to control over a conventional vehicle including only an engine as a driving force source.

The present disclosure is usable in a control apparatus for a vehicle and, more particularly, effectively usable in a control apparatus for a vehicle that is able to execute shift prohibition control and lower limit speed ratio control.

What is claimed is:

1. A control apparatus for a vehicle including a driving force source, a transmission and wheels, the control apparatus comprising
an electronic control unit configured to:
i) execute shift prohibition control, the shift prohibition control being control for prohibiting a shift of the transmission when the electronic control unit determines that a wheel spin has occurred;
ii) execute lower limit speed ratio control, the lower limit speed ratio control being control for limiting a lower limit speed ratio of the transmission in response to a vehicle body speed when the electronic control unit determines that a wheel lock has occurred; and
iii) when the electronic control unit determines that any one of a first condition and a second condition is satisfied, not execute the shift prohibition control and execute the lower limit speed ratio control,
the first condition being a condition that, after the electronic control unit starts the shift prohibition control, the wheel lock has occurred before a condition for cancelling the shift prohibition control is satisfied,
the second condition being a condition that, after the electronic control unit starts the lower limit speed ratio control, the wheel spin has occurred before a condition for cancelling the lower limit speed ratio control is satisfied.

2. The control apparatus according to claim 1, wherein
the condition for cancelling the shift prohibition control is satisfied when a first predetermined time has elapsed from a point in time at which a wheel spin amount falls within a first predetermined range, and
the condition for cancelling the lower limit speed ratio control is satisfied when a second predetermined time has elapsed from a point in time at which the wheel lock amount falls within a second predetermined range.

3. The control apparatus according to claim 2, wherein
the electronic control unit is configured to:
iv) calculate a wheel vehicle speed and the vehicle body speed, and calculate the wheel spin amount based on the wheel vehicle speed and the vehicle body speed, the wheel vehicle speed is a vehicle speed based on a speed of each wheel, and the vehicle body speed is a vehicle speed based on one of the lowest wheel speed and the second lowest wheel speed among the wheel speeds of the wheels; and
v) calculate a guard value of the vehicle, and calculate the wheel lock amount based on the wheel vehicle speed and the guard value, the guard value is a lower limit value of the vehicle body speed in the case of a wheel lock due to sudden brake.

* * * * *